US010009312B2

(12) United States Patent
Blinn

(10) Patent No.: US 10,009,312 B2
(45) Date of Patent: Jun. 26, 2018

(54) DELEGATING DNS RECORDS TO ADDITIONAL PROVIDERS

(71) Applicant: Go Daddy Operating Company, LLC, Scottsdale, AZ (US)

(72) Inventor: Arnold Blinn, Hunts Point, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 360 days.

(21) Appl. No.: 14/823,517

(22) Filed: Aug. 11, 2015

(65) Prior Publication Data

US 2017/0048186 A1  Feb. 16, 2017

(51) Int. Cl.
G06F 15/173 (2006.01)
H04L 29/12 (2006.01)

(52) U.S. Cl.
CPC ...... H04L 61/1511 (2013.01); H04L 61/1552 (2013.01)

(58) Field of Classification Search
CPC ............ H04L 61/1511; H04L 61/1552; H04L 67/2842; H04L 61/6013; H04L 61/10
See application file for complete search history.

(56) References Cited

U.S. PATENT DOCUMENTS

| | | | | |
|---|---|---|---|---|
| 2001/0052016 A1* | 12/2001 | Skene | ............ | G06F 9/505 709/226 |
| 2002/0010798 A1* | 1/2002 | Ben-Shaul | .......... | G06F 17/3089 709/247 |
| 2009/0164597 A1* | 6/2009 | Shuster | ............ | H04L 29/12066 709/206 |
| 2010/0106833 A1* | 4/2010 | Banerjee | .......... | H04L 29/12066 709/226 |
| 2012/0079115 A1* | 3/2012 | Richardson | ....... | H04L 29/12066 709/226 |
| 2012/0117621 A1* | 5/2012 | Kondamuru | ...... | H04L 29/12066 726/3 |
| 2013/0198065 A1* | 8/2013 | McPherson | ......... | H04L 61/1511 705/40 |
| 2013/0326599 A1* | 12/2013 | Bray | ................... | H04L 61/1511 726/6 |
| 2015/0271031 A1* | 9/2015 | Beevers | ............ | G06F 17/30241 709/224 |

* cited by examiner

Primary Examiner — Sargon Nano
Assistant Examiner — Kidest Mendaye
(74) Attorney, Agent, or Firm — Quarles & Brady, LLP

(57) ABSTRACT

Systems and methods of the present invention provide for one or more server computers communicatively coupled to a network, running a DNS server, and configured to: receive, from a client computer, an electronic message encoding a DNS request; access, within a database, at least one DNS record comprising: a designation of the DNS server as an authoritative DNS server for the DNS request; and a resource record designating a secondary authoritative server running on a second server computer; transmit, to the client computer, a DNS result according to the first resource record; transmit, to the secondary authoritative server, a second electronic message encoding a DNS query according to the second resource record; receive, from the secondary authoritative server, a DNS query result; store the DNS query result within a cache stored within the server computer; and transmit, to the client computer, the DNS query result.

18 Claims, 5 Drawing Sheets

DELEGATING DNS RECORDS TO ADDITIONAL PROVIDERS

FIELD OF THE INVENTION

The present invention generally relates to the field of Domain Name System (DNS) resolution and specifically to delegating the domain name resolution for certain record types from an authoritative DNS service provider to one or more additional DNS service providers.

SUMMARY OF THE INVENTION

The present invention provides systems and methods comprising one or more server computers communicatively coupled to a network, running a DNS server, and including instructions, that when executed by a processor running on the one or more server computers, cause the one or more server computers to: receive, from a client computer, an electronic message encoding a DNS request; access, within a database, at least one DNS record comprising: a designation of the DNS server as an authoritative DNS server for the DNS request; and a resource record designating a secondary authoritative server running on a second server computer; transmit, to the client computer, a DNS result according to the first resource record; transmit, to the secondary authoritative server, a second electronic message encoding a DNS query according to the second resource record; receive, from the secondary authoritative server, a DNS query result; store the DNS query result within a cache stored within the server computer; and transmit, to the client computer, the DNS query result.

The above features and advantages of the present invention will be better understood from the following detailed description taken in conjunction with the accompanying drawings.

DETAILED DESCRIPTION

Figure 1:
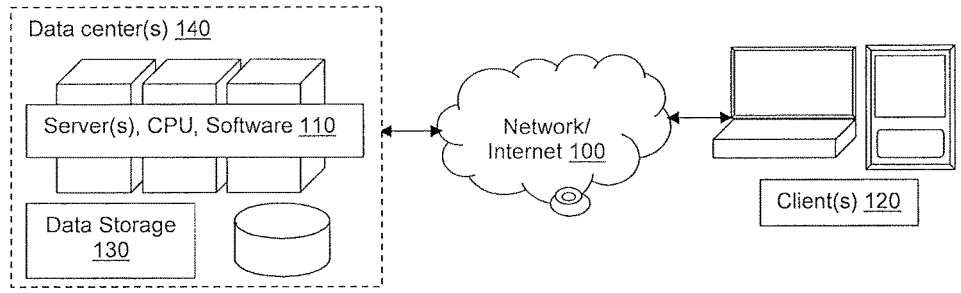
FIG. 1 illustrates a possible system for delegating DNS records to additional providers.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

The Internet maintains two principal namespaces: the domain name hierarchy and the IP address system. The DNS maintains the domain namespace and provides translation services between these two namespaces. The DNS is the world's largest distributed computing system that enables access to any resource in the Internet by translating user-friendly domain names to IP Addresses.

The DNS infrastructure consists of many different types of DNS servers, DNS clients, and transactions between these entities. The DNS connects Internet browsers running on clients to servers by translating URLs into the IP numbers that are used by routers and servers to direct HTTP requests and data to the right places. Specifically, clients may issue a query/request using a domain name and the DNS servers may receive the query/request originating from the client and resolve a domain name to an IP address for a website.

The process of translating domain names to IP Addresses is called name resolution. A DNS name resolution is the first step in the majority of Internet transactions. This DNS provides name resolution service through a family of servers called domain name servers. The DNS name resolution service is also called the DNS query/response. The DNS resolution, via a DNS client acting as a resolver, is the client side of a DNS query/response transaction, which takes place transparently in response to a sent resolution request within applications such as web browsers, e-mail clients, and other Internet applications residing in a local operating system. These applications handle the required communications.

The domain name resolution service may be provided through a family of servers within the DNS called Internet or domain name servers, which implement the DNS. A DNS name server is a server that responds with answers to queries against its DNS database. Each URL has a specific DNS server (or group of servers) that is authoritative, meaning that the authoritative DNS server knows the mapping of the URL to the appropriate IP address for the domain name. The authoritative DNS servers are the source of the information that recursive DNS servers (described below) send to web clients like browsers. Such authoritative DNS servers for a website are usually provided by web hosting companies or specialist DNS hosting companies. The DNS may distribute the responsibility for assigning domain names and may map them to IP networks by allowing an authoritative name server for each domain to keep track of its own changes.

The DNS resolution, via a DNS client acting as a resolver, is the client side of a DNS query/response transaction. A DNS query/response transaction is made up of a query originating from a DNS client (generically called a DNS resolver) and response from a DNS name server, resulting in a full resolution of the resource sought (e.g., translation of a domain name www.example.com into an IP address 123.4.56.78). Specifically, clients may issue a query/request using a domain name and the DNS servers may receive the query/request originating from the client and resolve a domain name to an IP address for a website.

Figure 3:
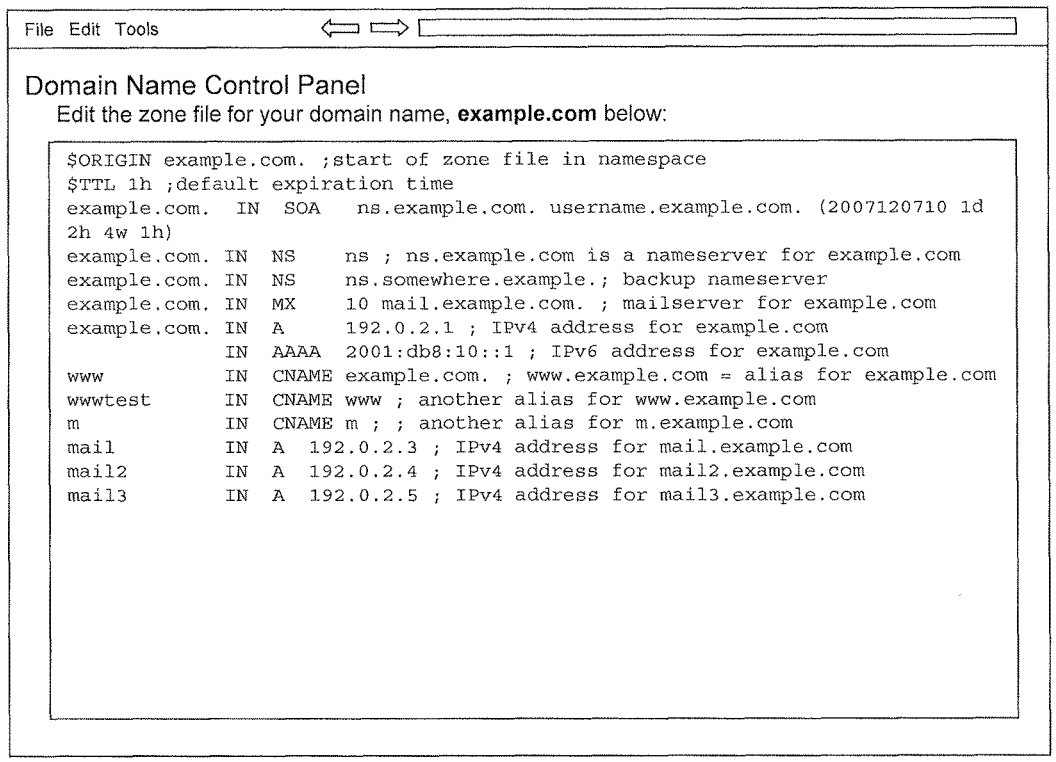
FIG. 3 is a example embodiment including a user interface used in delegating DNS records to additional providers.

The authoritative data needed for performing the name resolution service is contained in a file called the zone file. FIG. 3 demonstrates a non-limiting example of a zone file (as well as an example interface for editing a zone file). The hierarchical domain space is divided into administrative units called zones, and a zone usually consists of a domain (e.g., example.com) and possibly one or more sub domains (e.g., projects.example.com, services.example.com). The DNS root zone is the top-level DNS zone in the hierarchical namespace of the DNS of the Internet.

The DNS servers hosting the zone file are called the authoritative name servers for that zone. The top hierarchy of the DNS is served by one or more root, apex, or "top of the tree" name servers. The DNS asks the root or authoritative domain servers the IP address of the requested domain name. For example, in "www.example.com" the root domain name servers may ask what the IP address is for the authoritative servers for the ".com" TLD. Below the root, Internet resources are organized into a hierarchy of domains, administered by the respective registrars and domain name holders. In order to locate foo.example.com in the example.com example domain name above, the authoritative .com name servers may search for example.com, which may comprise at least two name server records. Example.com may then be searched for a name server record, a CNAME record or an A record for foo.example.com, which delegates authority to another zone.

A DNS file may comprise any configuration file used to configure the DNS for a specific domain name, website, email, etc. DNS configuration files, such as zone files for specific domain names or sub domains, may be used to configure the DNS for a specific domain name, website, email, etc. within zones, and the authoritative name servers within the DNS may host the respective zone files for that zone. However, it should be noted that not all zones are stored within files. Although zones are stored in files in the disclosed embodiments, this should in no way limit the scope of the invention. DNS files may comprise, as non-limiting examples, a file, a database, or any other data store known in the art. Name servers serving zone files each contain a small portion of the global domain space. In this way, the DNS serves as a global, distributed database which includes and uses a client-server model, as described above.

Zone files may include a collection of DNS records such as resource records. A resource record is the basic data element in the DNS, and each resource record has a type, examples of which include address records (A, AAAA), name server records (NS), and mail exchanger records (MX), service location records (SRV), text records (TXT), or any other DNS record types known in the art for a domain name. Each record may also include an expiration time limit, a class, and some type-specific data. Each record may also include various fields, such as NAME (a fully qualified domain name of the node in the hierarchy tree), TYPE (format of data for intended use, e.g., NS or MX servers), RDATA (e.g., IP addresses for address records), CLASS (e.g., IN for Internet), etc. Resource records of the same type define a resource record set.

Zone files may include an $ORIGIN, which indicates the root domain name. For example, the zone file for "example.com" would include an $ORIGIN field indicating that example.com is the root of this domain name.

A CNAME record is an abbreviation for Canonical Name record and is a type of resource record in the DNS used to specify that a domain name is an alias for another domain, the "canonical" domain. All information, including sub domains, IP addresses, etc, are defined by the canonical domain. CNAME records must always be pointed to another domain name, never to an IP-address, so that the IP address need only be changed in one place (the A record).

A recursive DNS name server is the part of the DNS that responds to a browser's queries, such as a URL entered into a browser as part of an HTTP request, in order to provide required information to web clients. This type of DNS server will fully answer the query (or give an error) by implementing a recursive algorithm necessary to query other name servers, possibly authoritative name servers (described below), as needed to resolve a given domain name.

Authoritative DNS name servers comprise name servers mapping a domain name to a resource based on a record type for the domain names under their control, such as mapping a domain name to an IP address for an A record, or mapping a domain name to additional and/or other types of data such as text records. In other words, the authoritative name server holds the canonical information, and therefore knows which IP maps to which URL for a given domain name. This information makes the authoritative name server a source of information that recursive DNS servers send to web client software, such as browsers and/or resolvers.

The recursive DNS name server receives and resolves any query, even if the recursive name server is not authoritative for the request, by consulting the authoritative server(s) for the appropriate response to the request. If the recursive name server can't answer a query (i.e., doesn't contain an entry for the host in its database), it recursively queries or looks up name servers higher up in the hierarchy. Said another way, recursive name servers traverse the hierarchical DNS tree from top to bottom (from the DNS root through to the authoritative name servers of the queried domain), until they hit the authoritative name server which knows the required IP number for the domain name included as part of the request.

The root zones of the DNS (and their respective domain name servers) may be considered the apex, or the "top of the tree" of knowledge of the IP addresses of the authoritative servers that handle DNS queries for Top Level Domains (TLD) like ".com." then the recursive DNS server asks the authoritative server for ".com" where it can find the "example" domain's authoritative server, and so on.

Recursive servers are almost always caching servers, meaning that, after receiving the mapping of URLs, including domain names to IP addresses via authoritative servers on behalf of client software such as browsers, the caching servers may store the DNS query results for which a resolver caches a DNS response and determined in the configuration. The recursive server typically caches a query from the authoritative server based on a TTL returned by the authoritative server. This configuration decreases the load on the authoritative servers, particularly root name servers, by avoiding having to repeatedly send the same queries to the same authoritative servers.

Applicant has determined that traditionally DNS is an all or nothing proposition. Either a first DNS service provider owns the DNS, or a second DNS service provider owns DNS. There is currently no way to split a DNS record across DNS providers, or for a first DNS service provider to delegate specific DNS records to another authority, such as the second DNS service provider. Applicant has therefore determined that optimal systems and methods comprise an architecture allowing the DNS to be split across multiple providers (i.e., delegating DNS for some record types to another authority).

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
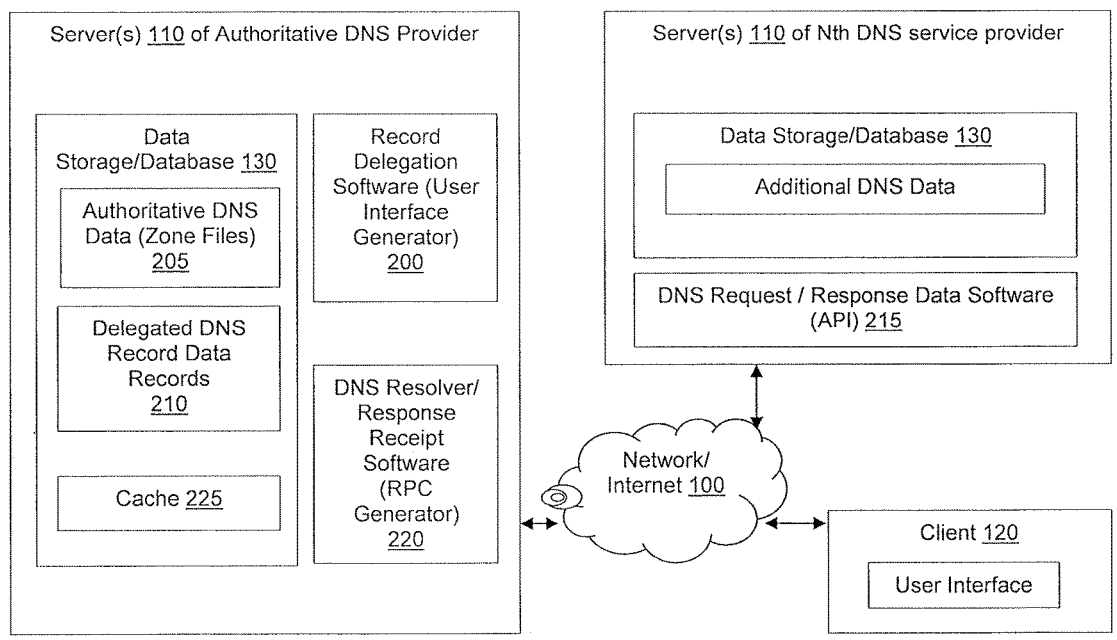
FIG. 2 illustrates a more detailed possible system for delegating DNS records to additional providers.

FIG. 2 shows a more detailed example embodiment of an environment for the systems, and for accomplishing the method steps, disclosed herein. As non-limiting examples, all disclosed software modules may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software, using data in data storage 130 associated with the software modules. Thus, the disclosed system may be configured to execute any or all of the method steps disclosed herein.

Regarding the current invention, various entities may be responsible for various elements within the DNS system and process. As non-limiting examples, an authoritative DNS service provider may comprise an entity such as GODADDY, made up of any combination of a domain name provider, DNS service provider, website hosting provider, etc. The authoritative DNS service provider may direct HTTP, FTP, DNS or other website content or Internet requests to one or more additional DNS service providers. These other DNS service providers may likewise provide domain name, DNS, website hosting or any Internet services.

As a non-limiting example, a primary DNS service provider such as GODADDY may own the DNS and act as an authoritative DNS service provider. However, even if the primary DNS service provider is a recognized hosting provider, some hosting customers, such as a website administrator, website designer or website owner, may wish to host their website via a secondary service provider such as a hosting service provider. To accomplish this, the primary DNS service provider would typically receive one or more DNS requests to be directed to the secondary service provider (possibly acting as a secondary DNS provider), process the request, and route it accordingly. In the context of the disclosed invention, website operators may select administrative options giving the secondary DNS service provider the ability to control elements of the DNS, specifically certain records within DNS files for the domain names.

As noted above, DNS is traditionally an all or nothing proposition. Either service provider 1 owns DNS, or service provider 2 owns DNS. Continuing the example above, GODADDY may own the DNS, but a website administrator or other customer may want to host a website with one of the secondary service providers. GODADDY, as the owner of the DNS, may be designated as the authoritative DNS provider.

However, once the authoritative DNS provider is established, it may delegate certain record types to one or more additional secondary service providers, such as the hosting service provider disclosed above. Using the non-limiting example above, GODADDY, by virtue of its ownership of the DNS may be designated as the authoritative DNS service provider, effectively splitting the DNS across providers by delegating the DNS for some record types to one or more of the secondary DNS service providers (e.g, the disclosed hosting company). The hosting company, as the host of the user's website may want control of, for example, the apex record @ and two CNAMEs (e.g., m. and www.), which point to something of the hosting company's choosing, and which may change over time.

In order for the authoritative DNS service provider to delegate control of these DNS records to one or more secondary service providers, the authoritative DNS service provider may execute a DNS record delegation software 200 running on its servers 110, as seen in FIG. 2, identifying DNS records within a zone file 205 (and/or storing these DNS records as delegated resource record data records 210), which should be delegated to the one or more secondary DNS service providers.

Figure 4:
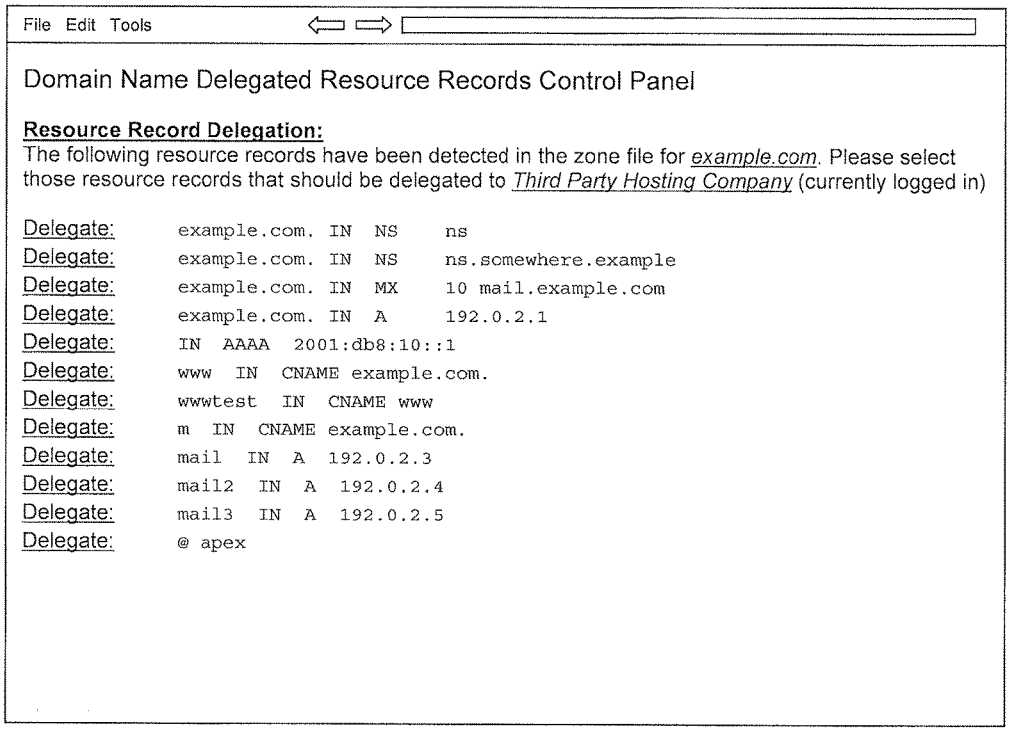
FIG. 4 is a example embodiment including a user interface used in delegating DNS records to additional providers.

The record delegation software 200 may include an interface generator component, which includes instructions causing the server computer(s) 110 to generate and transmit to a client computer 120 operated by the one or more additional DNS service providers, a user interface for display. This interface may allow the one or more additional DNS service providers to select the resource records they want delegated to their control in order to map specific DNS data. FIG. 4 shows a non-limiting example of the generated user interface, possibly part of a hosted website accessible to the one or more additional DNS service providers, displaying the resource records within a zone file 205 for a selected domain name/$ORIGIN. The user interface may provide means for the one or more additional DNS service providers to select records that the one or more additional DNS service providers want to be delegated under their control.

As an authoritative DNS service provider and DNS owner, the authoritative DNS service provider may have access to all zone files 205 for the domain names under their control. The record delegation and interface generator software 200 may therefore be configured to identify the zone file 205 for the domain name for which the one or more additional DNS service providers want the domain name records delegated. The record delegation and interface generator software 200 may then generate, from the identified zone file 205, the user interface, such as that shown in FIG. 4, by parsing and/or identifying the DNS records present within the zone file 205.

For each identified DNS record in the zone file 205, the software may generate a portion of the user interface allowing the one or more additional DNS service providers to select the DNS records that the authoritative DNS service provider will delegate control of that DNS record. The user acting on behalf of the one or more additional DNS service providers may access this user interface and select the DNS records that they want delegated to their control. Continuing the non-limiting example above, the third party hosting company may want the apex @, m. and www. DNS records delegated from GODADDY to their control. In the example above and shown in FIG. 4, a user representing the third party hosting company may select a button or link marked "Delegate." All selections made may then be transmitted to the record delegation software 200 running on the authoritative DNS provider's servers 110.

Figure 5:
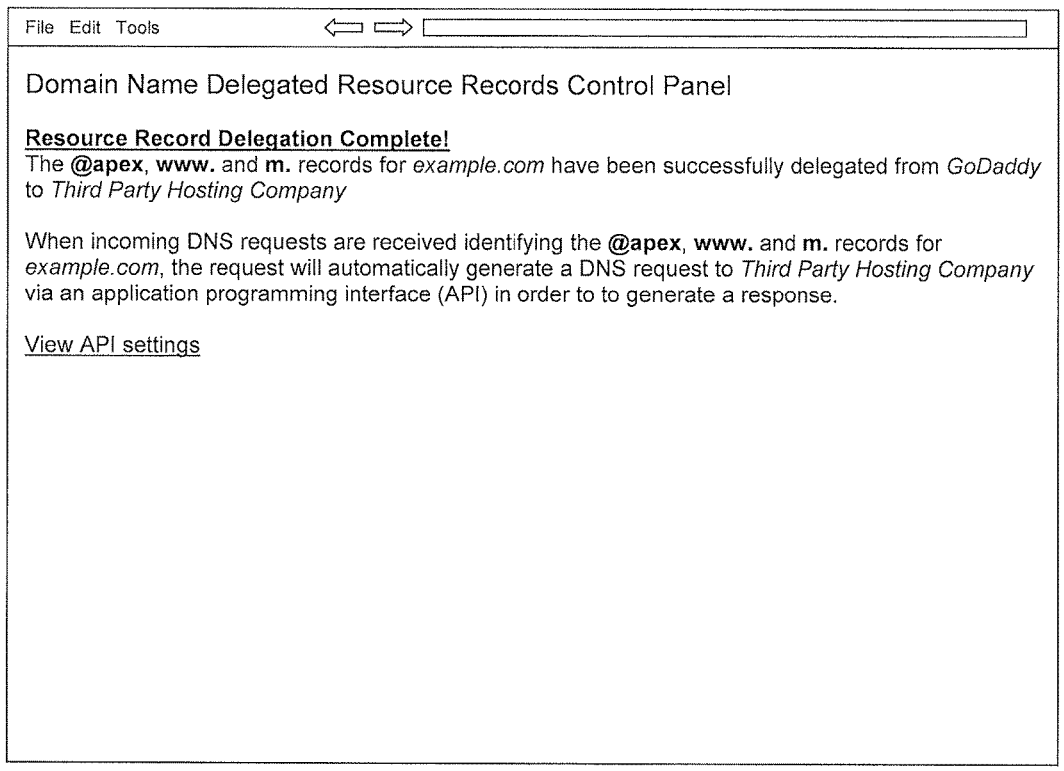
FIG. 5 is a flow diagram illustrating a possible embodiment of a method for delegating DNS records to additional providers.

FIG. 5 demonstrates a screenshot showing what the user interface would look like after records have been delegated. The interface may comprise a listing of all DNS record types delegated to the third party hosting company (in this case @ apex, www. and m.), and may include instructions explaining that the selected DNS records will now be delegated to the third party hosting company. In embodiments where the request is transmitted to the one or more additional DNS service providers, the user may have access to one or more control panels to adjust the settings for the API.

The record delegation software 200 running on the servers 110 may receive the selections of delegated DNS records and store them in data storage 130, possibly in association with a unique identifier for the additional DNS service provider. In some embodiments, each of the delegated DNS record selections may be stored as data records 210 in a database 130, each data record 210 possibly comprising the following information: a unique id for the data record 210; the domain name covered by the zone file 205 (e.g., the $ORIGIN for the zone); the DNS record type delegated (e.g., CNAME or record TYPE); means for accessing an API 215 (described below) for the additional DNS service provider/authority (e.g., URL for the API, authentication information, etc.); instructions/software parameters for the server 110 accessing the API (e.g., the DNS resolver software 220) to request and access information to resolve the request; means for contacting the appropriate name server for the one or more additional DNS service providers; any additional information required for delegating the resource record, resolving the request or accessing the API to resolve the request; or any combination thereof. Once the records have been delegated to the secondary provider, the primary provider is still authoritative. When a request for a record comes in that has been delegated, the primary provider may act more like a resolver. It makes a query to the secondary DNS provider for the appropriate record value, and caches it according to the TTL.

As an authoritative DNS service provider, the name servers hosted by the authoritative DNS service provider may include primary DNS name servers, and may also receive DNS requests. The software running on the servers 110 (possibly including record delegation software 200) may be configured to analyze the request to identify a requested DNS record type. Any means known in the art for identifying a requested DNS record type within an incoming request may be used to identify the requested DNS record type. As a non-limiting example, a query type within the incoming request may act as an indicator of the DNS class, and this DNS class may further identify the requested DNS record type. The requested record type may be used to search data storage 130 to identify delegated DNS records (possibly via a DNS record type field within delegated DNS record data records 210) to determine if any of the data/records include the requested record type identified in the request. Some embodiments may include a listener software (not shown) that loads the DNS record types for delegated DNS records into active memory. This software may search and analyze each request to determine if the request is associated with any of the DNS record types loaded into active memory. If found, the delegation logic described herein will apply.

If the software running on the servers 110 for the authoritative DNS server provider does not identify delegated DNS records for the DNS record type associated with the incoming request (e.g., in delegated DNS record data records 210), an authoritative DNS software logic (not shown) executed by these servers 110 may be configured to resolve the request as is known in the art, using the requested record type to look up the record and appropriate data based on the record type and use that data to determine the IP address for the requested resources. Thus, when someone queries the authoritative DNS for a random record outside of the delegated records (e.g., including any record which is not the apex @, m., or www. from the non-limiting example above), the authoritative DNS service provider may return the correct response, as the authoritative source. The DNS owned by the authoritative DNS service provider may therefore include the authoritative primary name server for each of the DNS record types. In some embodiments, the request may be received, and if no delegated DNS records are found in data storage 130, and no zone file and/or IP address is available for the requested resources, the authoritative primary name server may return an empty record set, including no values, and specify a specific value.

However, in embodiments where a delegated DNS record is identified in association with a request (e.g., the domain name and/or requested record type identified within the request is found in the associated delegated DNS record data record 210), a software executed by the servers 110 and operated by the DNS owner may be configured to act as a DNS request resolver. This DNS request resolver software 220 may be configured to identify the incoming request as requiring special treatment, resolving the request for the delegated DNS record as described below.

Specifically, these servers 110 (and the resolver software 220 running on them), may be configured to act as a DNS resolver for requests associated with DNS record types that have been delegated to the one or more additional DNS service providers. For example, the software may be configured to effectively state, in software terms: "I would like to know the IP address for www.example.com" The primary authoritative name servers for the domain name run by the authoritative DNS service provider, possibly using the resolver software 220, may then be configured to transmit an additional DNS query, based on the domain name and requested record type identified in the incoming request, to one or more secondary servers 110 operated by the one or more additional DNS service providers, in order to determine the IP address for the domain name and requested record type associated with the transmitted request (www.example.com, and @ apex, www. and m. in the example above).

The transmitted request to the one or more secondary servers 110 operated by the additional DNS service providers (and/or the application acting as a resolver) may originate from logic built into the resolver software 220, and thus may take place transparently in response to the original resolution request sent to the primary DNS server(s) operated by the authoritative DNS service provider. The resolver software 220 may be configured to handle both the incoming request communications, as well as the additional DNS query message transmitted to the secondary servers 110 for the one or more additional DNS service providers. The authoritative DNS service provider's DNS would therefore be authoritative, but because of the resolver software 220, would be acting like a resolver for certain record types (e.g., apex @, m., www. In the example above), taking the incoming request and resolving it to the secondary DNS servers owned and operated by the one or more additional DNS service providers.

In some embodiments, upon receiving the incoming DNS request (and assuming that the DNS request involves values identifying one or more DNS records delegated to the one or more additional DNS service providers), the resolver software 220 may work in conjunction with an API software 215 to issue a DNS query, possibly via a new protocol, to the secondary servers, which may then return the values requested by the query transmitted from authoritative DNS service provider. The authoritative DNS service provider may receive a response from the secondary servers, then process and return the response, possibly including DNS, website content or other data relevant to the request to the requesting client 120.

The API software 215 may comprise a software operated by the primary and/or secondary DNS service providers. This API software may be configured to receive and issue the DNS query from the primary servers to the secondary servers 110 operated by the one or more secondary DNS service providers. These secondary servers may receive the DNS query, including the requested domain name and requested record type and execute it as a recursive, or as a secondary authoritative server, in order to determine the IP address associated with the requested domain name and record type and/or provide any additional requested DNS data. The secondary server may execute the DNS query in order to determine the mapping of the domain name to the IP address, aggregate any additional requested data, and return the results for the DNS query to the primary servers 110.

For performance purposes, the authoritative DNS service provider may wish to cache the values returned from the DNS mapping or other data returned in response to the DNS query. In some embodiments, the resolver software 220 may be called and may cache values received from the secondary servers.

Once the IP is returned to the browser either directly from the primary or the primary proxying to the secondary, a browser may request the appropriate web page based on the returned DNS values.

Figure 6:
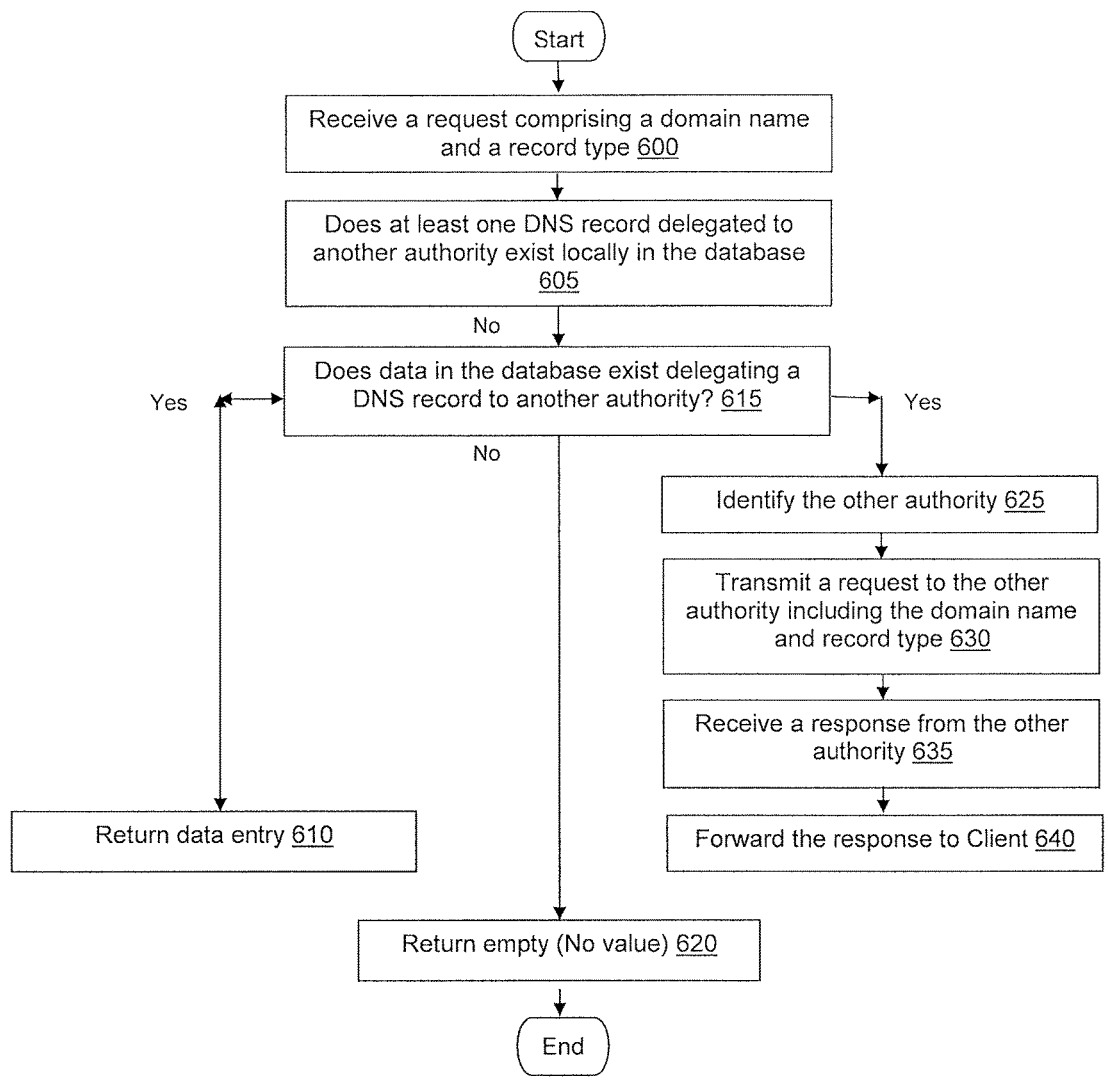
FIG. 6 is a flow diagram illustrating a possible embodiment of a method for delegating DNS records to additional providers.

FIG. 6 is a flow diagram demonstrating the process of resolving a DNS request where one or more DNS records are delegated by an authoritative DNS service provider to one or more additional DNS service providers. One or more primary server computers operated by the authoritative DNS service provider may receive, from one or more client computers, one or more electronic messages encoding a domain name and comprising an electronic request to translate the domain name into an IP address (Step 600).

The electronic request may comprise both a requested fully qualified domain name (FQDN) and a requested record type (e.g., A, AAAA, MX records, etc.). For example, the electronic request may be for "myemail.example.com." The primary servers operated by the authoritative DNS service provider may be configured to analyze the request to determine a query type, which may comprise an indicator of the DNS record class that identifies the requested record type. The primary server (s) may be configured to search their local data storage 130, possibly including DNS data 205, for a local entry comprising the domain name and requested record type or class (Step 605). If such a local entry exists, the primary server(s) may return the entry resolving the domain name to the appropriate IP address according to any known domain name resolution techniques (Step 610).

If the local entry is not found in the local data storage 130, the primary server(s), possibly using the record delegation software 200, may determine if the entry is delegated (Step 615), possibly by searching delegated DNS record data records 210 in data storage 130. If no delegated entries are found, the primary server(s) may return an empty record set (Step 620).

However, if the primary server(s) determine that the entry is delegated (Step 615), the primary server(s) may be configured, possibly using the record delegation software 200, to identify the at least one additional DNS service provider to which the record is delegated (Step 625). Once the at least one additional DNS service provider is identified, the primary server(s) may transmit a request comprising the domain name and the record type (possibly as an RPC), to one or more secondary server computers 110 operated by the at least one additional DNS service provider and possibly running the API 215 (Step 630). The secondary server(s) may receive the request, generate the response and transmit the response to the primary server(s).

The primary server(s) may receive the response from the secondary server(s) (Step 635), respond accordingly, and forward the response to the client (Step 640).

The steps included in the embodiments illustrated and described in relation to FIGS. 1-6 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising a server hardware computing device coupled to a network and comprising at least one processor executing computer-executable instructions within a memory which, when executed, cause the system to:
   run a domain name system (DNS) server;
   receive, from a client hardware computing device, an electronic message encoding a request to delegate at least one resource record for a domain name from a first DNS organization operating the server hardware computing device, to a second DNS organization;
   parse the at least one resource record from a zone file for the domain name;
   generate a graphical user interface (GUI) comprising:
      the at least one resource record; and
      a GUI control associated with each of the at least one resource record and configured to receive a selection of a resource record from among the at least one resource records to delegate the resource record from the first DNS organization to the second DNS organization;
   transmit the GUI to a client hardware computing device operated by the second DNS organization;
   receive, from the client hardware computing device, the selection;
   store, in association in a database, the resource record, and an Internet Protocol (IP) address associated in the database with the resource record and a second server hardware computing device operated by the second DNS organization;
   receive, from a second client hardware computing device, a DNS request;
   access, within the database, at least one DNS record comprising:
      a designation of the DNS server as an authoritative DNS server for the DNS request; and
      the resource record designating a secondary authoritative server running on the second server hardware computing device;
   transmit, to the second client hardware computing device, a DNS result according to the resource record;
   transmit, to the secondary authoritative server running on the second server hardware computing device, a second electronic message encoding a DNS query according to the resource record;
   receive, from the secondary authoritative server, a DNS query result;
   store the DNS query result within a cache stored within the server hardware computing device; and
   transmit, to the second client hardware computing device, the DNS query result.

2. The system of claim 1, further comprising an application programming interface (API) configured to:
   generate the DNS query;
   transmit the second electronic message to the secondary authoritative server; and
   receive the DNS query result.

3. The system of claim 2, wherein the API generates and transmits the DNS query to the secondary authoritative server, the secondary authoritative server returning at least one value responding to the DNS query.

4. The system of claim 3, wherein:
   the DNS query result is cached within the cache of the DNS server in association with a time to live; and
   the DNS server responds to any subsequent request until the time to live expires.

5. The system of claim 1, wherein:
   the DNS server is operated by an owner of a DNS; and
   the owner of the DNS delegates at least one record type within the DNS to a secondary DNS authority.

6. The system of claim 1, wherein:
   the DNS request identifies the domain name and a record type; and
   the resource record is identified within the database according to the domain name and the record type.

7. A method, comprising the steps of:
   running, by a server hardware computing device coupled to a network and comprising at least one processor executing computer-executable instructions within a memory, a domain name system (DNS) server;
   receiving from a client hardware computing device, by the server hardware computing device, an electronic message encoding a request to delegate at least one resource record for a domain name from a first DNS organization operating the server hardware computing device, to a second DNS organization;
   parsing, by the server hardware computing device, the at least one resource record from a zone file for the domain name;
   generating, by the server hardware computing device, a graphical user interface (GUI) comprising:
      the at least one resource record; and
      a GUI control associated with each of the at least one resource record and configured to receive a selection of a resource record from among the at least one resource records to delegate the resource record from the first DNS organization to the second DNS organization;
   transmitting, by the server hardware computing device, the GUI to a client hardware computing device operated by the second DNS organization;
   receiving, by the server hardware computing device, from the client hardware computing device, the selection;

storing, by the server hardware computing device, in association in a database, the resource record, and an Internet Protocol (IP) address associated in the database with the resource record and a second server hardware computing device operated by the second DNS organization;

receiving, by the server hardware computing device, from a second client hardware computing device, a DNS request;

accessing, by the server hardware computing device, within a database, at least one DNS record comprising:
   a designation of the DNS server as an authoritative DNS server for the DNS request; and
   the resource record designating a secondary authoritative server running on a second server hardware computing device;

transmitting by the server hardware computing device, to the second client hardware computing device, a DNS result according to the resource record;

transmitting, by the server hardware computing device, to the secondary authoritative server running on the second server hardware computing device, a second electronic message encoding a DNS query according to the resource record;

receiving, by the server hardware computing device, from the secondary authoritative server, a DNS query result;

storing, by the server hardware computing device, the DNS query result within a cache stored within the server hardware computing device; and transmitting, by the server hardware computing device, to the second client hardware computing device, the DNS query result.

8. The method of claim 7, further comprising the steps of:
generating, by an API running on the server hardware computing device, the DNS query;
transmitting, by the API, the second electronic message to the secondary authoritative server; and
receiving, by the server hardware computing device, the DNS query result.

9. The method of claim 8, wherein the API generates and transmits the DNS query to the secondary authoritative server, the secondary authoritative server returning at least one value responding to the DNS query.

10. The method of claim 9, wherein:
the DNS query result is cached within the cache of the DNS server in association with a time to live; and
the DNS server responds to any subsequent request until the time to live expires.

11. The method of claim 7, wherein:
the DNS server is operated by an owner of a DNS; and
the owner of the DNS delegates at least one record type within the DNS to a secondary DNS authority.

12. The method of claim 7, wherein:
the DNS request identifies the domain name and a record type; and
the resource record is identified within the database according to the domain name and the record type.

13. A method, comprising the steps of:
running, by a server hardware computing device coupled to a network and comprising at least one processor executing computer-executable instructions within a memory, a domain name system (DNS) server;
receiving from a client hardware computing device, by the server hardware computing device, an electronic message encoding a request to delegate at least one resource record for a domain name from a first DNS organization operating the server hardware computing device, to a second DNS organization;

parsing, by the server hardware computing device, the at least one resource record from a zone file for the domain name;

generating, by the server hardware computing device, a graphical user interface (GUI) comprising:
   the at least one resource record; and
   a GUI control associated with each of the at least one resource record and configured to receive a selection of a resource record from among the at least one resource records to delegate the resource record from the first DNS organization to the second DNS organization;

transmitting, by the server hardware computing device, the GUI to a second client hardware computing device operated by the second DNS organization;

receiving, by the server hardware computing device, from the client hardware computing device, the selection;

storing, by the server hardware computing device, in association in a database, the resource record, and an IP address associated in the database with the resource record and a second server hardware computing device operated by the second DNS organization;

receiving, by the server hardware computing device, from a second client hardware computing device, a DNS request;

accessing, by the server hardware computing device, within a database, at least one DNS record comprising:
   a designation of the DNS server as an authoritative DNS server for the DNS request; and
   the resource record designating a secondary authoritative server running on a second server hardware computing device;

transmitting by the server hardware computing device, to the second client hardware computing device, a DNS result according to the resource record;

transmitting, via an application programming interface (API) running on the server hardware computing device, to the secondary authoritative server, a second electronic message encoding a DNS query according to the resource record;

receiving, by the server hardware computing device, from the secondary authoritative server, a DNS query result;

storing, by the server hardware computing device, the DNS query result within a cache stored within the server hardware computing device; and transmitting, by the server hardware computing device, to the second client hardware computing device, the DNS query result.

14. The method of claim 13, further comprising the steps of:
generating, by the API, the DNS query;
transmitting, by the API, the second electronic message to the secondary authoritative server; and
receiving, by the server hardware computing device, the DNS query result.

15. The method of claim 14, wherein the API generates and transmits the DNS query to the secondary authoritative server, the secondary authoritative server returning at least one value responding to the DNS query.

16. The method of claim 15, wherein:
the DNS query result is cached within the cache of the DNS server in association with a time to live; and
the DNS server responds to any subsequent request until the time to live expires.

17. The method of claim 13, wherein:
the DNS server is operated by an owner of a DNS; and
the owner of the DNS delegates at least one record type within the DNS to a secondary DNS authority.

18. The method of claim 13, wherein:
the DNS request identifies the domain name and a record type; and
the resource record is identified within the database according to the domain name and the record type.

* * * * *